United States Patent [19]
Barnett et al.

[11] 3,818,066
[45] June 18, 1974

[54] PROCESS FOR THE PREPARATION OF ADIPONITRILE BY THE AMMOXIDATION OF CYCLOHEXANE

[75] Inventors: Clive Barnett; John Dewing, both of Runcorn, England

[73] Assignee: Imperial Chemical Industries Limited, London, England

[22] Filed: June 8, 1971

[21] Appl. No.: 150,913

Related U.S. Application Data

[63] Continuation of Ser. No. 770,826, Oct. 25, 1968, abandoned.

[30] Foreign Application Priority Data

Nov. 6, 1967  Great Britain .................... 50335/67

[52] U.S. Cl. .......................................... 260/465.3
[51] Int. Cl. .................. C07c 121/02, C07c 121/26
[58] Field of Search ................................. 260/465.3

[56] References Cited
UNITED STATES PATENTS

| 3,624,125 | 11/1971 | Barnett et al. ................... 260/465.3 |
| 3,627,817 | 12/1971 | Barnett et al. ................... 260/465.3 |

FOREIGN PATENTS OR APPLICATIONS

| 42-6724 | 3/1967 | Japan .............................. 260/465.3 |
| 42-11805 | 7/1967 | Japan .............................. 260/465.3 |
| 1,194,855 | 6/1970 | Great Britain .................... 260/465.3 |
| 1,556,127 | 1/1969 | France ............................. 260/465.3 |

*Primary Examiner*—Joseph P. Brust
*Attorney, Agent, or Firm*—Cushman, Darby & Cushman

[57] ABSTRACT

A process for the preparation of adiponitrile which comprises contacting a gaseous mixture consisting essentially of cyclohexane, ammonia and oxygen at a temperature of 300° to 700°C. with a solid catalyst consisting essentially of (1) antimony oxide, (2) molybdenum oxide, (3) a mixture of antimony oxide and the oxide of a metal selected from the group consisting of tin, titanium, and uranium wherein the ratio of antimony oxide to the other metal oxide is in the range 10:1 to 1:10 by weight or (4) molybdenum phosphate, and in the presence of a halogen-containing compound selected from the group consisting of fluorine-, chlorine-, and bromine-containing compounds, said halogen-containing compound being a halogen-containing compound which is volatile under the reaction conditions and is present in a concentration of 0.02 percent to 1 percent by volume of the reactants, or being an inorganic halide which is deposited on the catalyst surface in an amount of 0.1 percent to 5 percent by weight of the catalyst.

8 Claims, No Drawings

PROCESS FOR THE PREPARATION OF ADIPONITRILE BY THE AMMOXIDATION OF CYCLOHEXANE

This application is a continuation of Ser. No. 770,826, filed Oct. 25, 1968 and now abandoned.

This invention relates to a process for the preparation of aliphatic dinitriles, and especially to the preparation of adiponitrile, by the ammoxidation of cyclohexane or cyclohexene.

According to the present invention, a process for the preparation of aliphatic dinitriles comprises contacting a gaseous mixture comprising cyclohexane or cyclohexene, singly or in admixture, ammonia and oxygen with a solid catalyst comprising a compound of antimony or molybdenum and oxygen, at an elevated temperature, in the presence of a halogen at the catalyst surface. The temperature of reaction is generally from 300° to 700°C and preferably from 350° to 550°C.

The presence of a halogen at the surface of the catalyst may be induced either by doping the solid catalyst with a halogen-containing compound, for example, an inorganic halide, such as the chloride, bromide or fluoride of cadmium, titanium III, lead, iron, aluminum or zinc, or by incorporating a volatile chlorine-, bromine- or fluorine-containing compound in the feed gases. Whichever method is used, the presence of halogen results in an enhancement of the activity of the catalyst. The enhancement usually tends to reduce the life of the catalyst somewhat, but the effect obtained by doping the solid catalyst is likely to be more transient than that obtained by using a halogen-containing feed gas. It is sometimes advantageous to use a combination of the two methods, since it is possible to sustain or reactivate a halide-doped catalyst by the introduction of a halogen-containing compound into the feed gas at the appropriate stage. Thus the halogen compound may be introduced into the feed-gas continuously or intermittently, the chosen operating cycle depending on the desired balance of such opposing factors as the catalyst activity, and its effective lifetime. Especially suitable volatile chlorine-, bromine- and fluorine-containing compounds are the chloro-, bromo and fluoro-alkanes, such as methylene dichloride or dibromide, 1:2 dichloro or dibromo ethane or carbon tetrafluoride. Other possible chloroalkanes are chloroform and carbon tetrachloride.

As some of the halogen in the reaction zone will tend to associate with the ammonia present and form the appropriate ammonium halide, for example, ammonium chloride, the amount present should be kept as low as possible without being so low as to lose the desired enhancement, so that fouling of the apparatus by deposited ammonium halide may be kept to a minimum. Generally speaking, the proportion of halogen-containing compound in the feed gas may be conveniently from 0.02 to 1 percent by volume, about 0.05 to 0.07 percent by volume being preferred.

When the catalyst is doped by the addition of an inorganic halide, it may suitably be present from 0.1 to 5 percent by weight. The doped catalysts are conveniently preparable by evaporating a solution of the dopand over a pre-formed catalyst.

The solid catalysts which may be used in the process of our invention fall into two general classes: those based on compounds containing antimony and oxygen, and those based on compounds containing molybdenum and oxygen.

Catalysts of the first class may consist of antimony oxide alone or in admixture with one or more other oxides. When not used alone the antimony oxide is preferably mixed with a tin or uranium oxide, but other oxides, for example, those of iron, thorium, cerium, manganese, samarium, titanium, the mixture of rare earths known as didymium, lanthanum, bismuth, thallium, zinc, lead or cadmium may be used in addition to or instead of the tin or uranium oxide.

When antimony oxide is used alone it may be present as the trioxide, tetroxide or pentoxide or as a mixture of two or more of these oxides. When oxides of other metals are present they may take the form of separate metal oxides incorporated in the catalyst by physical mixing, alternately they may be present in chemical combination with the antimony oxide, for example as an antimonate; the essential requirement is that the catalyst should consist essentially of antimony, optionally with one or more other metals, and oxygen.

The oxide or mixed oxide catalysts may be prepared by mixing the individual oxides; it is also possible to prepare them from substances which yield oxides on heating, for example, hydroxides or hydrated oxides, such as metastannic acid. When mixed oxides are required it is often convenient to prepare them by co-precipitation of the hydroxides or hydrated oxides of the required metals by hydrolysis of a solution of their salts, for example, the halides. The precipitate may then be filtered, dried and calcined to yield the mixed oxides. This method of preparation has the advantage of ensuring intimate mixing of the oxides. It may also be possible to prepare a suitable catalyst by precipitation of the antimonate or pyroantimonate of the other metal followed by filtration and calcining as before. There may be considerable variation in the ratio of antimony oxide to other metal oxide, but generally it is in the range 10:1 to 1:10 by weight.

Catalysts of the second class consist essentially of molybdenum and oxygen; but in addition it is advantageous to use an acidic material, for example, an oxide of phosphorus, arsenic or boron, as a promotor. When a promotor is incorporated in the catalyst, it is convenient for it to be in combination with the molybdenum, e.g., as molybdenum phosphate. When no promotor is added, the catalyst may be prepared from molybdenum or a molybdenum compound which will yield molybdenum oxide when heated in oxygen at 450°–650°C. If a promotor is used aqueous solutions of a molybdenum compound and the promotor may be thoroughly mixed, evaporated and the solid residue baked as before. Inorganic molybdenum compounds, such as molybdic acid, ammonium molybdate, and cobalt molybdate, or organic molybdenum compounds such as molybdenum oxalate may be used as catalysts of this class.

The catalysts are preferably used in granular form to facilitate gas/solid contact. They may be used alone or mixed with an inert solid diluent, such as silica or alumina. It is also possible to use an inert support such as alumina or kaolin, in which case it is most convenient to impregnate the support with a solution which will yield the appropriate oxide or oxides. The inert diluent may be present in the amount to 90 percent by volume of the catalyst mixture; but 60–70 percent may be conveniently used.

The choice of diluent or support will depend upon the conditions under which the reaction is performed, but, generally the antimony-based catalysts are employed with a solid diluent whereas the molybdenum-based catalyst are preferably used with an inert support.

The catalysts may be used as prepared, but it is preferred that they are pre-heated before use, especially if such treatment has not formed part of their preparation. The temperture of such heat-treatment may be from 550° to 650°C, but higher temperatures may be used if desired. However, it is preferred that the heat-treatment temperature is at least as high as that at which the catalyst is to be used.

The gas feed in our process comprises cyclohexane or cyclohexene, oxygen and ammonia, the cyclohexane and cyclohexene, which may be present singly or in admixture, being hereinafter referred to as the "hydrocarbon."

The ratio of hydrocarbon to ammonia may suitably be from 1:3 to 7:1, and the ratio of oxygen to hydrocarbon from 2:1 to 8:1, both ratios being on a volume basis. The presence of an inert gas, such as nitrogen and/or water vapour, may be tolerated in the gas feed and may be desirable. In some circumstances the nitrogen may account for as much as 50 or 60 percent by volume of the feed gas so that air may be used as in inexpensive source of oxygen. Typically the hydrocarbon content of the feed gases may be from 3 to 8 percent by volume, but may be varied over much wider limits, for example, from 1 to 20 percent.

The process is preferably operated on a continuous basis, with mean gas feed/catalyst contact times from 0.4 to 5 seconds. By "contact time" we mean a figure, in seconds, obtained by dividing the volume of catalyst by the gas flow per second. Pressures used are normally atmospheric or slightly higher to enable suitable control of throughput of the gas feed, but will generally not exceed 5 atmospheres. Temperature of reaction will ordinarily be in the range 350° to 550°C, but the optimum value will tend to vary with different catalyst/gas feed combinations. However, it may be readily determined for any particular combination, for example, by varying the reaction temperature and continually monitoring conversion and selectivity until optimum values are obtained.

When catalysts according to our invention are doped with an inorganic halide, the dopand may be introduced by any convenient means. A preferred method is to soak the catalyst with a solution of the appropriate halide. This may be conveniently accomplished by stirring a preformed oxide catalyst with a saturated aqueous solution of the metal halide, drying the slurry or paste produced and calcining it at the heat-treatment temperature as described above.

The process of our invention may be carried out in any suitable manner by which a gaseous feedstock may be contacted with a solid, particulate catalyst. For example, the feed gas may be passed through a heated, tubular reactor packed with granulated catalyst, alternatively, a fluid bed may be used.

The particulate size of the catalyst components is not critical, but should be within the range normally used in fixed bed or fluid bed reactors. The optimum size for any application will depend on the size and proportions of the reactor and on balancing such factors as providing high surface area of catalyst, avoiding close packing of catalyst which is liable to impede gas flow and on whether a fixed or fluid bed is used. When the catalyst is of the multi-component type, e.g., mixed oxide and/or oxide/diluent, it is preferred that the various components have similar particle sizes to facilitate mixing and to minimise the effects of segregation under the influence of the gas flow.

Normally a mixture of dinitriles is produced, comprising adiponitrile, glutaronitrile and succinonitrile. Adiponitrile, which is usually the principal dinitrile present in the product is useful as an intermediate in high polymer production.

The dinitriles may be recovered from the reaction products by conventional techniques, such as absorption in a solvent or condensation. For example, in a preferred method, the effluent gases are condensed in a cold trap immersed in a solid carbon dioxide/methanol mixture. The liquid condensation product may then be analysed by any convenient means, for example, by gas/liquid chromatography.

Without prejudice to the invention, it is thought that the mechanism of our process involves the interaction of the halogeno-, e.g., chloro- or bromo, compound used (either as a catalyst dopand or as a feed-gas additive) at the catalyst surface probably with the formation of a fragmented halogeno-species which is responsible for the activating effect. This effect may involve an increase of the overall conversion with or without a modification of the selectivity of the reaction. In this context, "conversion" means that proportion of the hydrocarbon feed which has reacted, and "selectivity" means the proportion of reacted hydrocarbon feed which has formed the appropriate dinitrile.

The enhancement of catalyst activity in the presence of halogen may be as much as 60 percent but will vary with such factors as the composition of the catalyst, temperature of reaction and residence time; the optimum conditions being selected to give the particular effect desired, e.g., high conversion and/or high selectivity with respect to a particular dinitrile.

The process of the invention is illustrated by the following examples.

Catalyst Preparation:

1. Antimony/Tin Oxide Catalyst 334.2 gms. of $SnCl_4 \cdot 5H_2O$ were dissolved at room temperature in 500 mls. of 1 percent of HCl solution to form a colourless solution. This solution and 250 mls. (575 gms.) of $SbCl_5$ were added dropwise to 2 liter of cold distilled water, whilst vigorously stirring the water. A solid precipitate formed and HCl fumes were evolved. The temperature of the aqueous mixture rose to about 60°C. When the addition of the two solutions was complete the mixtures were cooled with stirring to room temperature. Concentrated ammonia (specific gravity 0.88) was then added to the aqueous mixture, whilst stirring vigorously, to adjust the pH to about 5. In the course of the additions of the ammonia, the mixture became hot, reaching a temperature of about 60°C. The resultant mixture was then cooled, whilst stirring slowly, to room temperature, and filtered under suction to separate the fine white precipitate. The catalytic properties of the eventual combined oxides were found to be impaired by digesting the acidic liquor containing the precipitated oxides at an elevated temperature (e.g., 96°C) before the ammonia addition but subsequent filtration is facilitated by such digestion. The precipitate was washed with cold distilled water (10 ×

200 mls.) dried at 150°C for 12 hours, heated at 380°C for 4 hours, and finally heated at 550°C for 18 hours. The resulting greenish brown solid, having an Sb/Sn ratio of 2:1, was ground to between 10 and 30 mesh B.S.S. and mixed with twice its own weight of silica chips of the same particle size. The mixture was used as catalyst in the appropriate examples. A mixed oxide catalyst having an Sb/Sn ratio of 3:1 was prepared by the same general procedure, using the appropriate quantities of $SnCl_4 \cdot 5H_2O$ and $SbCl_5$.

2. Antimony/Titanium Oxide Catalyst 59.0 g. of Antimony pentachloride and 0.1 mole of titanium tetrachloride in 10 percent hydrochloric acid were added dropwise to 1 liter of water at equal rates. The mixture was heated at 90°–100°C for 10 hours and 250 ml. of water was added. After cooling 0.880 ammonia was added to bring the suspension to pH 8. The precipitate was filtered off, washed and calcined using the general procedure given under (1). The antimony/titanium ratio was 2:1.

3. Antimony/Uranium Oxide Catalyst 10.8 g. of Uranyl acetate and 60 g. of $SbCl_5$ were added separately to 1,500 ml. of water, and the pH of the mixture adjusted to 8 with concentrated ammonia. The precipitate formed was filtered washed and calcined, using the general procedure given under (1) above. The antimony/uranium ratio was 2:1.

4. Molybdenum Trioxide Catalyst

Molybdic acid (200 g.) was roasted in a stream of air at 550°C for 20 hours. The resulting oxide was ground to between 10 and 30 mesh B.S.S. and was mixed with twice its own weight of silica chips of the same particle size. This mixture was used as catalyst in the appropriate example.

5. Molybdenum Phosphate Catalyst

Ammonium phospho molybdate (300 g.) was roasted in a stream of air at 600° to 650°C for 24 hours. The resulting molybdenum phosphate was ground to between 10 and 30 mesh B.S.S. and was mixed with twice its own weight of silica chips of the same particle size. This mixture was used as catalyst in the appropriate Example.

6. Cobalt Molybdate Catalyst

Cobalt nitrate (29 g.) was dissolved in 60 ml. of water and ammonium molybdate (123 g.) was dissolved in 100 ml. of water. The resulting solutions were mixed at 60°C with stirring. Ammonia (S.G. 0.880) was added to the mixture until its pH was 6.7 It was then cooled and filtered. The precipitate was washed thoroughly with water (10 × 200 ml.), dried at 120°C and finally calcined at 650°C for 16 hours. The resulting cobalt molybdate was ground to between 10 and 30 mesh B.S.S. and mixed with twice its own weight of silica chips of the same particle size. This mixture was used as catalyst in the appropriate example.

Ammoxidation Procedure

A feed gas was made up by mixing steams of cyclohexane, ammonia air, and nitrogen. The rate of flow of feed through the catalyst-containing reactor was 9 to 18 liters per hour and the catalyst volume was about 10 mls., giving contact times in the range 1.0 to 4.0 secs. The appropriate gas feed composition and contact time is stated in each example.

The components of the feed gas were supplied to a mixing vessel, comprising a glass bulb packed with glass helices and maintained at a temperature of 100°C, via separate rotary flow meters. From the mixing vessel the gas stream was passed to the reactor vessel which incorporated a pre-heater section containing silica chips (10 to 30 mesh B.S.S.) at reaction temperature, and, following thereon, a principal section containing the ammoxidation catalyst.

The effluent from the reactor was passed into a cold trap immersed in a solid carbon dioxide/methanol mixture. The liquid condensation product was analysed by gas/liquid chromatography.

Example 1

Using the general procedure given above, cyclohexane was ammoxidised using an antimony/tinoxide catalyst having an Sb/Sn ratio of 2:1 prepared as detailed under (1) above.

| Gas Feed Composition: (By volume) | Cyclohexane | 5.0% |
|---|---|---|
| | Oxygen | 10.0% |
| | Nitrogen | 78.4% |
| | Ammonia | 6.6% |

Halogen added as methylene chloride = 0.05 percent by volume.

| Temperature | 450°C |
|---|---|
| Mean Contact Time: | 1.95 secs. |

The product contained a mixture of adiponitrile (ADN) glutaronitrile (GN) and succinonitrile (SN). Analysis of the product gave the following results:

| Conversion of Cyclohexane | | 28.4% (19.3%) |
|---|---|---|
| Selectivity with respect to | ADN | 25.9% (23.7%) |
| | GN | 14.7% (14.2%) |
| | SN | 5.4% (3.5%) |

The results shown in brackets in this and the other examples are those obtained when the appropriate experiment was repeated with no added methylene chloride. It will be seen that in these experiments conversion was improved but selectivity relatively unaffected.

Example 2

Catalyst and conditions as for Example 1, except that the reaction temperature was 550°C

| Conversion of Cyclohexane | | 38.9% (27.2%) |
|---|---|---|
| Selectivity with respect to | ADN | 15.9% (14.1%) |
| | GN | 11.1% (10.6%) |
| | SN | 6.3% (2.2%) |

Example 3

Catalyst and conditions as for Example 1 except that the mean contact time was 3.9 secs.

| Conversion of Cyclohexane | | 30.7% (21.4%) |
|---|---|---|
| Selectivity with respect to | ADN | 23.3% (22.9%) |
| | GN | 13.5% (13.7%) |
| | SN | 5.2% (3.9%) |

Example 4

The same general procedure was used with a molybdenum trioxide catalyst, prepared as detailed under (4) above.

| Gas Feed Composition (By volume) | Cyclohexane | 2.0% |
| --- | --- | --- |
| | Oxygen | 16.0% |
| | Nitrogen | 76.0% |
| | Ammonia | 8.0% |

Halogen added as methylene chloride = 0.05 percent by volume.

| Temperature: | 440°C |
| --- | --- |
| Mean Contact Time: | 2.4 secs. |

The product contained a mixture of adiponitrile, glutaronitrile and succinonitrile. Analysis yielded the following results:

| Conversion of cyclohexane | | 29.2% (19.3%) |
| --- | --- | --- |
| Selectivity with respect to | ADN | 23.2% (21.0%) |
| | GN | 16.2% (15.5%) |
| | SN | 3.0% (3.1%) |

Example 5

The same general procedure was used with a molybdenum phosphate catalyst, prepared as detailed under (5) above.

| Gas Feed Composition (By volume) | Cyclohexane | 2.2% |
| --- | --- | --- |
| | Oxygen | 15.5% |
| | Nitrogen | 78.3% |
| | Ammonia | 4.0% |

Halogen added: Methylene chloride = 0.05 percent by volume.

| Temperature: | 440°C |
| --- | --- |
| Mean Contact Time: | 1.2 secs. |

The product contained a mixture of adiponitrile, glutaronitrile and succinonitrile. Analysis yielded the following results:

| Conversion of cyclohexane | | 29.8% (18.5%) |
| --- | --- | --- |
| Selectivity with respect to | ADN | 22.7% (18.7%) |
| | GN | 14.9% (15.2%) |
| | SN | 6.4% (7.5%) |

In these experiments both overall conversion and selectivity with respect to ADN were improved by addition of methylene chloride.

Example 6

The same general procedure was used with a cobalt molybdate catalyst, prepared as detailed under (6) above.

| Gas Feed Composition (By volume) | Cyclohexane | 5.0% |
| --- | --- | --- |
| | Oxygen | 10.0% |
| | Nitrogen | 78.4% |
| | Ammonia | 6.6% |

Halogen added as Methylene Chloride = 0.05 percent by volume.

| Temperature: | 450°C |
| --- | --- |
| Mean Contact Time: | 1.95 secs. |

The product contained a mixture of adiponitrile, glutaronitrile and succinonitrile. Analysis yielded the following results:

| Conversion of cyclohexane | | 20.3% (14.0%) |
| --- | --- | --- |
| Selectivity with respect to | ADN | 19.7% (18.4%) |
| | GN | 15.2% (17.3%) |
| | SN | 7.9% (8.2%) |

Examples 7 and 8

The same general procedure was used with an Sb/Sn, 2:1 mixed oxide catalyst.

| Gas Feed Composition (By volume) | Cyclohexane | 5.0% |
| --- | --- | --- |
| | Ammonia | 7.5% |
| | Air | 50.0% |
| | Nitrogen | Remainder |
| Temperature 435°C | | |
| Contact Time 1.8 secs. | | |

The results are summarised in tabular form:

| Ex. No. | Gas Feed Additive | % Halogen (By volume) | % Conversion of Cyclohexane | % Selectivity | | |
| --- | --- | --- | --- | --- | --- | --- |
| | | | | ADN | GN | SN |
| | NIL | NIL | 21.7 | 22.6 | 14.0 | 3.5 |
| 7 | CH$_2$Cl$_2$ | 0.07 | 28.5 | 21.9 | 14.7 | 3.7 |
| 8 | CF$_4$ | 0.02 | 27.3 | 21.0 | 13.0 | 5.3 |

| Ex. No. | Gas Feed Additive | % Halogen (By volume) | % Conversion of Cyclohexane | % Selectivity | | |
| --- | --- | --- | --- | --- | --- | --- |
| | | | | ADN | GN | SN |

Example 9

The same general procedure was used with an Sb/Sn 3:1 mixed oxide catalyst.

| Temperature 430°C | | |
|---|---|---|
| Contact Time 1.5 secs. | | |
| Gas Feed Composition | Cyclohexane | 8.4% |
| (By volume) | Ammonia | 14.0% |
| | Air | 50.0% |
| | Nitrogen | Remainder |

Halogen added to feed as $CH_2BrCH_2Br = 0.02$ percent by volume

| Conversion of cyclohexane | | 24.2% (19.5%) |
|---|---|---|
| Selectivity with respect to | ADN | 21.1% (21.7%) |
| | GN | 12.9% (12.4%) |
| | SN | 6.2% (5.1%) |

Example 10

The same general procedure was used with a mixed Sb/Ti oxide catalyst prepared as under (2) above.

| Temperature 440°C | | |
|---|---|---|
| Contact Time 2.0 secs. | | |
| Gas Feed Composition | Cyclohexane | 7.0% |
| (By volume) | Ammonia | 14.0% |
| | Air | 79.0% |
| | Nitrogen | Remainder |

Halogen added to feed as $CH_2Cl_2 = 0.07$ percent by volume

| Conversion to cyclohexane | | 32.5% (24.2%) |
|---|---|---|
| Selectivity with respect to | ADN | 18.2% (19.7%) |
| | GN | 14.9% (13.5%) |
| | SN | 4.1% (5.9%) |

Example 11

The same general procedure was used with mixed Sb/U oxide catalyst prepared as under (3) above.

| Temperature 435°C | | |
|---|---|---|
| Contact Time 2.0 secs. | | |
| Gas Feed composition | Cyclohexane | 5.0% |
| (By volume) | Ammonia | 10.0% |
| | Air | 50.0% |
| | Nitrogen | Remainder |

Halgoen added to feed as $CH_2Cl_2 = 0.07$ percent by volume

| Conversion of cyclohexane | | 29.8% (21.3%) |
|---|---|---|
| Selectivity with respect to | ADN | 23.7% (24.3%) |
| | GN | 10.8% (10.3%) |
| | SN | 2.8% (4.0%) |

Examples 12–14

These examples relate to Sb/Sn, 2:1 mixed oxide catalysts doped with metal halides using the procedure given under (7) above. No halide was added to the feed gas. In each Example the gas feed composition was: 5.0 percent cyclohexane, 10 percent ammonia, 50 percent air and remainder nitrogen. Temperature used was 440°C and contact time 2.5 secs. The results are tabulated below.

| Ex. No. | Dopand | % Conversion of Cyclohexane | % Selectivity | | |
|---|---|---|---|---|---|
| | | | ADN | GN | SN |
| 12 | $TiCl_3$ | 24.2 | 17.9 | 13.3 | 4.2 |
| 13 | $CdF_2$ | 24.0 | 22.4 | 12.9 | 4.9 |
| 14 | $FeBr_2$ | 22.7 | 20.4 | 14.7 | 3.5 |
| — | NIL | 15.1 | 24.1 | 15.2 | 2.0 |

Example 15

The same general procedure was used with an Sb/Sn, 2:1, mixed oxide catalyst and contact time of 2.0 secs. The feed gas composition was: 5.0 percent cyclohexane, 7.5 percent ammonia, 44.5 percent air, nitrogen remainder. The course of the reaction was followed over a period of about 7 hours, during which time 0.07 percent $CH_2Cl_2$ was added to the gas feed for a period and then discontinued. It will be seen from the results, which are presented in tabular form, that the percent conversion increased to a steady value as the reactor came to its full working temperature and there was a marked enhancement of conversion on the addition of $CH_2Cl_2$ to the feed gas which died away slowly after the addition was discontinued. This indicated that there was some modification of the catalyst which persisted for some time after halide addition was discontinued.

| Time from Start (Min) | Temp in Reactor (°C) | % Conversion | % Selectivity | | |
|---|---|---|---|---|---|
| | | | ADN | GN | SN |
| 10 | 200 | — | — | — | — |
| 30 | 260 | — | — | — | — |
| 60 | 350 | 7.3 | 11.4 | 2.5 | — |
| 90 | 420 | 16.9 | 25.2 | 13.8 | 2.1 |
| 100 | 435 | 19.3 | 23.7 | 14.2 | 3.5 |
| 120 | 440 | 19.1 | 24.0 | 14.1 | 3.5 |
| 150 * | 435 | 19.5 | 23.7 | 13.9 | 4.0 |
| 170 | 435 | 24.7 | 23.5 | 14.0 | 3.5 |
| 190 | 435 | 28.5 | 23.5 | 14.0 | 3.6 |
| 210 | 435 | 27.9 | 24.7 | 14.0 | 3.9 |
| 230 | 435 | 27.9 | 23.9 | 13.7 | 3.3 |
| 250 | 440 | 28.7 | 23.2 | 13.9 | 3.1 |
| 270 ** | 440 | 28.8 | 23.5 | 13.3 | 3.2 |
| 330 | 440 | 25.4 | 23.6 | 13.7 | 3.7 |
| 350 | 435 | 20.0 | 23.7 | 13.9 | 3.5 |
| 400 | 435 | 18.9 | 23.4 | 13.3 | 3.5 |

\* Halide added to gas feed
\*\* Halide addition discontinued

What we claim is:

1. A process for the preparation of adiponitrile which comprises contacting a gaseous mixture selected from the group consisting of (a) mixtures consisting essentially of cyclohexane, ammonia and oxygen and (b) mixtures consisting essentially of cyclohexane, ammonia, oxygen and from 0.02 to 1 percent by volume of a chloro-, bromo- or fluoro-alkane which is volatile under the conditions of contact, at a temperature of 300° to 700°C. with a solid catalyst consisting essentially of (1) antimony oxide, (2) molybdenum oxide, (3) a mixture of antimony oxide and the oxide of a metal selected from the group consisting of tin, titanium and uranium wherein the ratio of antimony oxide to the other metal oxide is in the range 10:1 to 1:10 by weight or (4) molybdenum phosphate an inorganic metal halide, wherein said metal is cadmium, titanium, lead, iron, aluminum or zinc, being deposited on the catalyst surface in an amount of 0.1 to 5 percent by weight of the catalyst at least when the gaseous mixture is a mixture (a).

2. The process of claim 1 wherein the cyclohexane constitutes from 1 to 20 percent by volume of the reactants, the ratio of cyclohexane to ammonia is from 1:3 to 7:1 by volume and the ratio of oxygen to cyclohexane is from 2:1 to 8:1 by volume.

3. The process of claim 1 wherein the halogen-containing compound is methylene chloride, 1,2-dibromoethane or carbon tetrafluoride.

4. The process of claim 1 wherein the concentration of halogen-containing compound in the reactants is from 0.05 to 0.07 percent by volume.

5. The process of claim 1 wherein the halogen-containing compound is an inorganic metal halide selected from the group consisting of titanium trichloride, cadmium fluoride, and ferrous bromide.

6. The process of claim 1 wherein the catalyst consists of antimony oxide and the oxide of a metal selected from the group consisting of tin, titanium, and uranium.

7. The process of claim 1 wherein the catalyst is preheated before use to a temperature of 550° to 650°C.

8. The process of claim 1 wherein the inorganic metal halide is a chloride, bromide or fluoride of cadmium, titanium, lead, iron, aluminum or zinc and the volatile halogen compound is methylene dichloride or dibromide, 1:2 dichloro or dibromo ethane, carbon tetrafluoride, chloroform or carbon tetrachloride.

* * * * *